(12) United States Patent
Imanishi

(10) Patent No.: US 7,664,597 B2
(45) Date of Patent: Feb. 16, 2010

(54) ADDRESS INPUT METHOD AND APPARATUS FOR NAVIGATION SYSTEM

(75) Inventor: Shunichi Imanishi, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 85 days.

(21) Appl. No.: 11/095,169

(22) Filed: Mar. 31, 2005

(65) Prior Publication Data

US 2006/0224312 A1    Oct. 5, 2006

(51) Int. Cl.
G06F 17/30    (2006.01)

(52) U.S. Cl. .......................... 701/209; 707/3; 340/988; 382/198

(58) Field of Classification Search ................ 701/200, 701/209, 202, 208; 340/995.1, 539, 531, 340/988; 707/3; 382/187, 198
See application file for complete search history.

(56) References Cited

U.S. PATENT DOCUMENTS

| | | | | | |
|---|---|---|---|---|---|
| 4,438,505 | A | * | 3/1984 | Yanagiuchi et al. ............. 704/7 |
| 5,059,965 | A | * | 10/1991 | Geiser .................... 340/995.23 |
| 5,072,395 | A | * | 12/1991 | Bliss et al. ................... 701/200 |
| 5,262,948 | A | * | 11/1993 | Kato .......................... 715/201 |
| 5,471,392 | A | * | 11/1995 | Yamashita .................. 701/200 |
| 5,825,306 | A | * | 10/1998 | Hiyokawa et al. ........... 340/988 |
| 5,968,109 | A | * | 10/1999 | Israni et al. ................. 701/208 |
| 6,088,649 | A | | 7/2000 | Kadaba et al. |
| 6,112,153 | A | * | 8/2000 | Schaaf et al. ............... 701/200 |
| 6,424,908 | B2 | * | 7/2002 | Urban et al. ................ 701/200 |
| 6,731,316 | B2 | * | 5/2004 | Herigstad et al. ........... 715/864 |
| 2006/0015246 | A1 | * | 1/2006 | Hui ............................ 701/201 |
| 2006/0031062 | A1 | * | 2/2006 | Bakis et al. ................. 704/201 |
| 2006/0100999 | A1 | * | 5/2006 | Sencaj et al. .................... 707/3 |
| 2006/0167935 | A1 | * | 7/2006 | Atarashi et al. .......... 707/104.1 |
| 2006/0220923 | A1 | * | 10/2006 | Tanizaki et al. .......... 340/995.1 |

FOREIGN PATENT DOCUMENTS

| | | | |
|---|---|---|---|
| JP | 57030081 A | * | 2/1982 |
| JP | H8-23498 | | 3/1996 |
| JP | 2680317 | | 8/1997 |

* cited by examiner

Primary Examiner—Tuan C To
(74) Attorney, Agent, or Firm—Muramatsu & Associates

(57) ABSTRACT

A method and apparatus for use with a navigation system allows a user to easily and quickly input an address of a destination with use of a specially made database even when spelling of the address is not certain to the user. The navigation system is designed to help the user in entering a desired street name accurately and efficiently by checking candidate cities when a first character of street name is specified. Since the user accurately knows at least the first character of the intended street name, the candidate street names will be narrowed down by selecting the city. The user may further input second character and further characters upon which the navigation system incrementally retrieves candidate street names with use of the comprehensive alphabetical usage file.

9 Claims, 14 Drawing Sheets

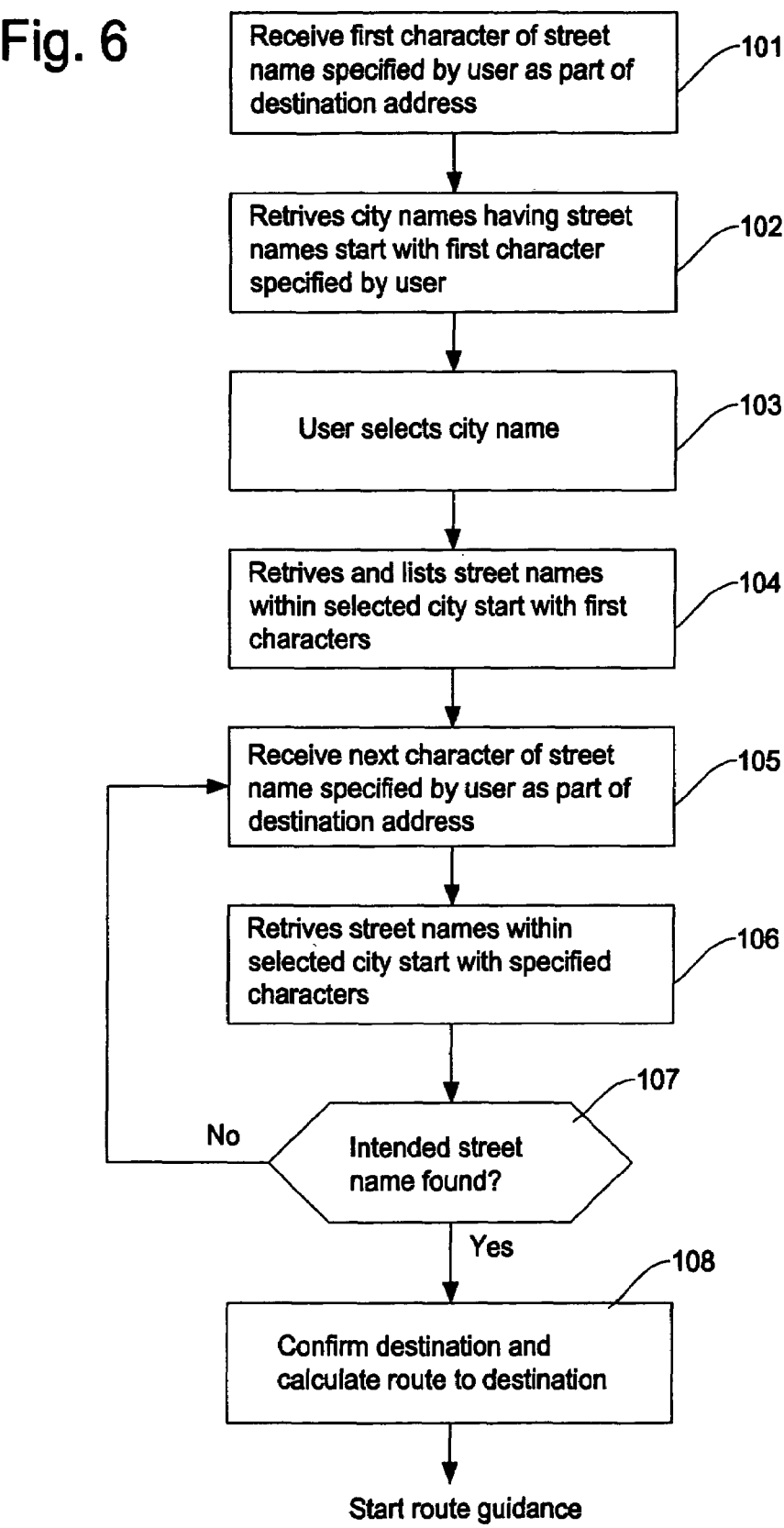

Fig. 7A

| 61 | 63 | 65 | | | |
|---|---|---|---|---|---|
| a | Abbey | City C | City F | City M | City X |
|  | Abbot | City A | City P | City S | City Z |
|  | Abeto | CityB | City K |  |  |
|  | ..... | .......... |  |  |  |
|  | ..... | .......... |  |  |  |
|  | Antigoni | City G | City X |  |  |
|  | Avenida | City D | City H | City R | City W |
| b | Bacon | City D | City H | City R | City W |
|  | Bailey | City A | City P | City Z |  |
|  | Baker | CityB | City K | City O | City P |
|  | ..... | .......... |  |  |  |
|  | ..... | .......... |  |  |  |
|  | Bryan | CityB | City K | City G | City X |
|  | Butterfield | City C | City F | City M |  |
| c | Cactus | City P | City S | City Z |  |
|  | Callela | CityB | City K | City G | City X |
|  | Camino | CityB | City K | City O | City P |
|  | ..... | .......... |  |  |  |
|  | ..... | .......... |  |  |  |
|  | Comatta | City D | City H | City R | City W |
|  | Costa | City C | City F | City M | City X |
| ..... | ..... | .......... |  |  |  |
|  | ..... | .......... |  |  |  |
| z | Zamora | City A | City C | City Z |  |
|  | Zavala | City G | City X |  |  |
|  | Zimmerman | City L | City O | City Y |  |
|  | ..... | .......... |  |  |  |
|  | ..... | .......... |  |  |  |
|  | Zoro | City H | City R |  |  |
|  | Zwelling | City F | City M |  |  |

Fig. 7B

| 71 | 73 | 75 | | | |
|---|---|---|---|---|---|
| a | Aliso Viejo | Table 1 | Table 2 | Table 3 | Table X |
| | Brea | Table 1 | Table 2 | Table 3 | Table X |
| | El Toro | Table 1 | Table 2 | Table 3 | Table X |
| | ..... | .......... | | | |
| | ..... | | | | |
| | Tustin | Table 1 | Table 2 | Table 3 | Table X |
| b | Aliso Viejo | Table 1 | Table 2 | Table 3 | Table X |
| | Cypress | Table 1 | Table 2 | Table 3 | Table X |
| | Foothill Ranch | Table 1 | Table 2 | Table 3 | Table X |
| | ..... | .......... | | | |
| | ..... | | | | |
| | Yorba Linda | Table 1 | Table 2 | Table 3 | Table X |
| c | Coto De Caza | Table 1 | Table 2 | Table 3 | Table X |
| | Irvine | Table 1 | Table 2 | Table 3 | Table X |
| | Newport Beach | Table 1 | Table 2 | Table 3 | Table X |
| | ..... | .......... | | | |
| | ..... | | | | |
| | Westminster | Table 1 | Table 2 | Table 3 | Table X |
| . | ..... | .......... | | | |
| . | ..... | | | | |
| . | ..... | | | | |
| | ..... | | | | |
| z | Cypress (TX) | Table 1 | Table 2 | Table 3 | Table X |
| | Olive | Table 1 | Table 2 | Table 3 | Table X |
| | Red Hill | Table 1 | Table 2 | Table 3 | Table X |
| | ..... | .......... | | | |
| | ..... | | | | |
| | Talega | Table 1 | Table 2 | Table 3 | Table X |
| 1 | Cypress (CA) | Table 1 | Table 2 | Table 3 | Table X |
| | Irvine | Table 1 | Table 2 | Table 3 | Table X |
| | Segovia | Table 1 | Table 2 | Table 3 | Table X |
| 2 | ..... | .......... | | | |
| | ..... | | | | |
| | Tampa | Table 1 | Table 2 | Table 3 | Table X |

Fig. 8A

City A

Start with "a"

```
ABALONE
ACACIA
ADOLF          —81a
AERO
AINTHWORTH
AIRPORT
```

Table 1 (2nd alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
|   | X | X | X | X |   |   |   | X |   |   |   |   |   |   |   |   |   |   |   |   |   |   |   |   |   |

Table 2 (3rd alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
| X |   |   |   |   |   |   |   |   |   |   |   |   | X | X |   |   | X |   |   |   |   |   |   |   |   |

Table 3 (4th alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
|   | X |   |   |   |   |   |   |   |   |   | X |   |   | X | X |   |   |   | X |   |   |   |   |   |   |

Table 6 (7th Alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
|   |   |   | X |   |   |   |   |   |   |   |   |   |   | X |   |   |   | X |   |   |   |   |   |   |   |

Table X (8th Alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
|   |   |   |   |   |   |   |   |   |   |   |   |   |   |   |   |   | X |   |   |   |   |   |   |   |   |

Fig. 8B

City A

Start with "b"

```
BAKER
BARRANCA
BAYHILL         —81b
BEVERLY
BLACKBIRD
BROADWAY
BUOY
```

Table 1 (2nd alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
| X |   |   |   | X |   |   |   |   |   | X |   |   |   |   |   |   | X |   | X |   |   |   |   |   |   |

Table 2 (3rd alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
| X |   |   |   |   |   |   |   | X |   |   |   |   | X |   |   |   | X |   |   | X |   |   |   | X |   |

Table 3 (4th alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
| X |   | X | X |   | X |   |   |   |   |   |   |   |   |   |   |   | X |   |   |   |   |   |   | X |   |

Table 6 (7th Alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
|   | X |   |   |   |   |   |   |   |   |   | X | X |   |   |   |   |   |   |   |   |   | X |   |   |   |

Table X (8th Alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
| X |   |   |   |   |   |   |   |   |   |   |   |   |   |   |   |   | X |   |   |   |   |   |   | X |   |

Fig. 9

| 171 | 173 | 175 | | | |
|---|---|---|---|---|---|
| a | Abashiri-shi | Table 1 | Table 2 | Table 3 | Table Z |
| | Minato-ku | Table 1 | Table 2 | Table 3 | Table Z |
| | Ohra-gun ..... | ......... ......... | | | |
| | Wako-shi | Table 1 | Table 2 | Table 3 | Table Z |
| i | Asahikawa-shi | Table 1 | Table 2 | Table 3 | Table Z |
| | Daito-ku | Table 1 | Table 2 | Table 3 | Table Z |
| | Fujieda-shi ..... | ......... ......... | | | |
| | Matsumoto-shi | Table 1 | Table 2 | Table 3 | Table Z |
| u | Aomori-shi | Table 1 | Table 2 | Table 3 | Table Z |
| | Fukui-shi | Table 1 | Table 2 | Table 3 | Table Z |
| | Toyama-shi ..... | ......... ......... | | | |
| | Yodogawa-ku | Table 1 | Table 2 | Table 3 | Table Z |
| . . . | ..... ..... | ......... ......... | | | |
| ka | Ako-shi | Table 1 | Table 2 | Table 3 | Table Z |
| | Chichibu-shi | Table 1 | Table 2 | Table 3 | Table Z |
| | Ohoshima-gun ..... | ......... ......... | | | |
| | Yokoyama-shi | Table 1 | Table 2 | Table 3 | Table Z |
| ki | Fuji-shi | Table 1 | Table 2 | Table 3 | Table Z |
| | Koriyama-shi | Table 1 | Table 2 | Table 3 | Table Z |
| | Tokanaga-gun ..... | ......... ......... | | | |
| | Yokogawa-shi | Table 1 | Table 2 | Table 3 | Table Z |
| ku | Iida-shi | Table 1 | Table 2 | Table 3 | Table Z |
| | Kumagaya-shi | Table 1 | Table 2 | Table 3 | Table Z |
| | Morioka-shi ..... | ......... ......... | | | |
| | Tokoro-gun | Table 1 | Table 2 | Table 3 | Table Z |
| . . . | ..... ..... | ......... ......... | | | |

Fig. 10

City (Hagoromo-shi)

Start with "sa"

```
saiwai-cho
sarashina
sakashita-cho          181
satake-cho
sawanotsuru
sayonara-cho
```

Table 1 (3rd alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
|   |   |   |   |   |   |   |   | X |   | X |   |   |   |   |   |   | X |   | X |   |   | X | X |   |   |

Table 2 (4th alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
| X |   |   |   |   |   |   |   |   |   |   |   |   |   | X |   |   |   |   |   |   |   | X |   |   |   |

Table 3 (5th alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
| X |   |   |   |   |   |   |   |   |   | X |   | X |   |   |   |   |   | X |   |   |   |   |   |   |   |

⋮

Table 5 (7th Alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
|   | X |   |   |   |   |   |   | X |   |   |   |   |   |   |   |   | X | X |   |   |   |   |   |   |   |

Table Z (8th Alphabets)

| a | b | c | d | e | f | g | h | i | j | k | l | m | n | o | p | q | r | s | t | u | v | w | x | y | z |
|---|---|---|---|---|---|---|---|---|---|---|---|---|---|---|---|---|---|---|---|---|---|---|---|---|---|
| X |   |   |   |   |   |   | X |   |   |   |   |   |   | X |   |   |   | X | X |   |   |   |   |   |   |

ADDRESS INPUT METHOD AND APPARATUS FOR NAVIGATION SYSTEM

FIELD OF THE INVENTION

This invention relates to a navigation system for guiding a user to a destination, and more particularly, to a method and apparatus for inputting an address of a destination in the navigation system easily and quickly with use of a specially made database even when spelling of the address is not certain to a user.

BACKGROUND OF THE INVENTION

A navigation system performs travel guidance for enabling a user to easily and quickly reach the selected destination. A typical example is a vehicle navigation system where a vehicle carries a navigation function. Such a navigation system detects the position of the user or user's vehicle, and reads out map data pertaining to an area at the current vehicle position from a data storage medium in the navigation system. The navigation system displays a map image on a monitor screen while superimposing a mark representing the current location of the user on the map image. When a destination is set, the navigation system starts a route guidance function for setting a guided route from the start point to the destination and guides the user to the destination.

FIGS. 1A-1H show an example of overall procedure and screen display involved in the navigation system. FIG. 1A shows an example of locator map screen of the navigation system typically used when the destination is not specified. The navigation system displays a street on which the vehicle (current vehicle position VP) is running on a map image and a name of the street. Other information such as a north pointer NP, a map scale and a current time may also be illustrated on the display screen.

FIGS. 1B-1F show an example of process for specifying a destination in the navigation system. When selecting a "Destination" menu on a main menu screen of FIG. 1B, the navigation system displays an "Find Destination By" screen as shown in FIG. 1C for specifying an input method for selecting the destination. The "Find Destination By" screen lists various methods for selecting the destination. This example includes the methods of "Address", "Intersection", "Point of Interest", "Recent Route", "Address Book", and "Today's Plan" which are well known in the art.

When selecting, for example, the "Address" method in FIG. 1C, the navigation system displays a keyboard screen in FIG. 1D. Suppose the user inputs an address "2525 W. Carson" of a "Del Amo" shopping mall, the navigation system displays a "Confirm Destination" screen such as shown in FIG. 1E. If the name and address on the screen shows the correct destination, the user enters an "OK to Proceed" key to proceed to the next procedure.

In FIG. 1F, the navigation system calculates and determines a route to the destination, i.e., the address "2525 W. Carson". The navigation system determines a route to the destination based on, for example, the quickest way to reach the destination, the route using many free ways as possible or the route without using toll road, and the like. In this example, the navigation system displays a progress scale of the calculation of the route.

Once the route to the destination is determined, the navigation system starts the route guidance as shown in FIG. 1G for guiding the user to the destination. Typically, the navigation system shows the intersection which is highlighted to show the next turn and a direction of the turn. Such route guidance by the navigation system is also accompanied by voice instructions. By approaching every intersection to turn, the navigation system automatically displays the intersection guidance diagram to instruct the user which direction to turn at the intersection.

The navigation system measures a distance to the current destination to detect whether the destination is within a predetermined range such as within 100 meters. When the user approaches the destination within such a predetermined distance, the navigation system indicates that the destination "Dest" is ahead as shown in FIG. 1H. The navigation system detects the actual arrival based on various factors such as the engine stop.

As noted above, a process of entering a street name (address) is frequently needed when setting a destination in the navigation system. FIG. 2A shows a display example on a screen of a navigation system for entering a street name for specifying an address of a destination. This display example is functionally equivalent to the display shown in FIG. 1D. In FIG. 2A, a keyboard 28 is used to enter a street name and street number, and a window 27 shows characters entered by a user or candidate street names based on the characters specified by the user.

In entering a street name, the user must have a sufficiently solid recollection of the desired street name and its spelling. Unless the user knows the name of the street or correct spelling of the street name, the user will not be able to set the navigation system to the desired destination. Moreover, even when the user knows of a correct spelling for a destination, inputting all the characters for the street name is cumbersome and error-prone.

To overcome the shortcomings above, an incremental matching method is proposed. This method searches candidate street names as soon as any character is input and disables keys that will not be followed by characters that have entered for the candidate street names to help the user to press correct keys. An example of a display utilizing the incremental matching method is shown in FIG. 2B. The user has input "ASHL" as the first four letters of a desired street name. Disabled keys are shadowed and cannot be entered because disabled letters will not follow the input as a valid street name. In this example, only the keys "E" and "A" are enabled because possible street names that satisfy the user's input are "ASHLAND CIR", "ASHLAND PL", "ASHLEAF", "ASHLEY CT" and "ASHLEY PL".

However, even if this method is used, the navigation system will fail to disable adequate number of keys to help the user in inputting a desired street name if the user remembers only the first few letters correctly. In the example above, the user may only remember that the desired street name starts with "ASH" and is not certain for the rest. In such a case, the navigation system may fail to narrow down the candidate street names, and accordingly, fail to disable adequate keys on the keyboard 28 to help the user. Moreover, the user may be confused by the similar sounding street names, such as "ASHLEY" and "ASHLEAF", resulting in mistakenly selecting a wrong street name.

Thus, there is a need to provide an efficient and effective method of assisting the user to input a desired street name in a navigation system.

SUMMARY OF THE INVENTION

It is, therefore, an object of the present invention to provide an address input method and apparatus of a navigation system for quickly and accurately finding a desired street name for selecting a destination.

It is another object of the present invention to provide an address input method and apparatus of a navigation system for efficiently finding an intended street name even when spelling of the street name is uncertain to the user.

It is a further object of the present invention to provide an address input method and apparatus of a navigation system for efficiently finding an intended address of a destination when the navigation system is operated under the environment of foreign language.

One aspect of the present invention is a method of inputting an address of a destination in a navigation system. The method is comprised of the steps of: receiving a first character of an address of a destination specified by a user; reading a precompiled data file to search administrative regions that have the addresses that start with the first character specified by the user; displaying a list of names of the administrative regions that have the addresses that start with the first character specified by the user; receiving a name of the administrative region selected by the user from the list; displaying candidate addresses that start with the first character specified by the user within the selected administrative region; and selecting the address of the destination out of the candidate addresses.

The method of the present invention, before the step of selecting the address of the destination, further includes the steps of: receiving a second character of the address of the destination specified by the user; retrieving candidate addresses that start with the first and second characters within the selected administrative region; displaying candidate addresses that start with the first and second characters specified by the user within the selected administrative region; and repeating the above steps for further characters that follow the first and second characters.

In the present invention, the address of the destination includes a street name that can be specified by alphabetical characters or a combination of alphabetical characters and numeral characters. The administrative region includes city, county, and state. The city names and state names are associated with one another in the precompiled data file and are sorted by the first character of the street names throughout the country.

The precompiled data file includes a data file which classifies administrative region names according to the first character of the address. Further, the precompiled data file includes a comprehensive alphabetical usage file which has a plurality of character tables that indicate possible characters of the addresses that follow the first character within the selected administrative region.

Another aspect of the present invention is an apparatus for inputting an address of a destination in the navigation system for implementing the various steps of the method noted above. The apparatus is designed to help the user in entering a desired street name accurately and efficiently by checking candidate cities when a first character of street name is specified. After selecting the city name, the user may further input second character and further characters upon which the navigation system incrementally retrieves candidate street names with use of the comprehensive alphabetical usage file.

According to the present invention, the navigation system checks the precompiled data file when a first character is input by the user. The navigation system lists the city names that have the street names which start with the first character specified by the user. Since the user accurately knows at least the first character of the intended street name, the candidate street names will be narrowed down by selecting the city. The user may further input second character and further characters upon which the navigation system incrementally retrieves candidate street names with use of the comprehensive alphabetical usage file. By repeating this procedure, the user is able to find the desired street name easily and quickly without need of entering all of the characters. The user is able to find the desired street name easily and quickly even when he is not certain about the spelling of the street name.

BRIEF DESCRIPTION OF THE DRAWINGS

FIG. 6 is a flow chart showing the operational procedure for entering an intended street with the aid of the navigation system of the present invention.

FIGS. 7A and 7B show examples of structure of the precompiled data files incorporated in the present invention where FIG. 7A shows a structure of a city name and first character file and FIG. 7B shows a structure of a comprehensive alphabetical usage file.

FIGS. 8A and 8B are schematic diagrams showing structural examples of character tables in the comprehensive alphabetical usage file in the present invention where FIG. 8A shows a set of alphabetical tables for street names that start with "a" in a particular city and FIG. 8B shows a set of alphabetical tables for street names that start with "b" in the same city as that of FIG. 8A.

FIG. 9 shows another example of structure of the city name and first character file in the precompiled data file of the present invention when the input method of the present invention is applied to administrative region and address system used in Japan and described based on the Japanese phonetic sounds.

FIG. 10 is schematic diagram showing structural example of character tables in the comprehensive alphabetical usage file in the present invention for use in combination of the data file of FIG. 9 when the input method of the present invention is applied to the Japanese administrative region system and the Japanese language.

DETAILED DESCRIPTION OF THE INVENTION

The present invention will be described in detail with reference to the accompanying drawings. The navigation system of the present invention is designed to help the user in entering a desired street address accurately and efficiently by checking candidate street names and cities based on characters input by a user. In the present invention, data files are precompiled for retrieval of street name data with respect to administrative region data. Such an administrative region is hereafter called a "city" although it also includes a county and a state as well.

The precompiled files include a city name and first character file which includes a list of city names each having street names that start with a specified first character. Another file is configured by a comprehensive alphabetical usage file which are configured for each city that list second, third, fourth . . . characters of the street names that start with the first character. The comprehensive alphabetical usage file is linked to the city name and first character file noted above.

The navigation system reads the city name and first character file every time when a first character is input by the user. The present invention is based on the assumption that a user accurately knows at least the first character of the intended street name. The navigation system performs an incremental matching operation and displays a list of city names that have street names that start with the first character that the user has input through a keyboard. The user selects a city name as soon as the navigation system shows a list of city names.

The navigation system retrieves the street names that start with the first character with use of the city name and first character file and displays a list of street names within the selected city. If a list of the street name is relatively large, the user may prefer to input a second character rather than checking the street names in the list by scrolling the screen. Through the incremental matching process, the navigation system retrieves the street names that start with the first and second characters with use of the comprehensive alphabetical usage file and displays a list of street names within the city. Thus, the candidate street names are further narrowed down. By repeating the procedure noted above, the user is able to find the desired street name easily and quickly without need to enter all of the characters.

Figure 3:
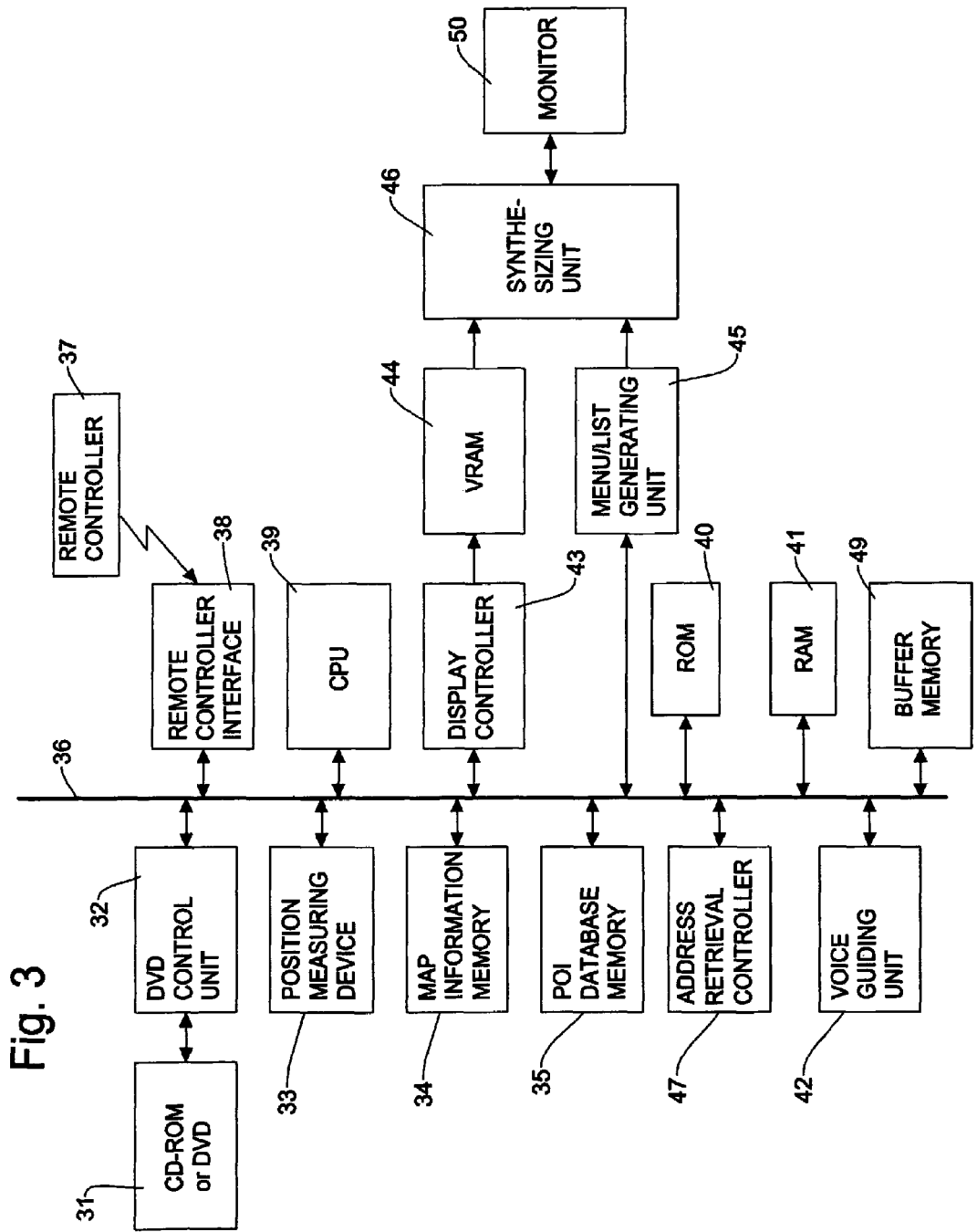
FIG. 3 is a block diagram showing an example of structure of a vehicle navigation system implementing the present invention.

FIG. 3 shows a structure of a vehicle navigation system for implementing the present invention. While the vehicle navigation system is explained for an illustration purpose, the present invention can also be applied to other types of navigation system. For example, the present invention can be applied to a portable navigation device implemented by a PDA (personal digital assistant) device, other hand-held devices such as a wireless telephone, or a laptop computer.

In the block diagram, the navigation system includes a map storage medium 31 such as a CD-ROM, DVD, hard disc or other storage means (Hereafter "DVD") for storing map information. Alternatively, such map data can be provided to the user from a remote server through a communication network such as Internet. The navigation system includes a DVD control unit 32 for a controlling an operation for reading the map information from the DVD, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (Global Positioning System) receiver, and etc.

The block diagram of FIG. 3 further includes a map information memory 34 for storing the map information which is read from the DVD 31, a database memory 35 for storing database information such as point of interest (POI) information which is read out from the DVD 31, a remote controller 37 for executing a menu selection operation, an enlarge/reduce operation, a destination input operation, etc. and a remote controller interface 38.

Although a remote controller is a typical example for selecting menus, executing selected functions and etc., the navigation system includes various other input methods to achieve the same and similar operations done through the remote controller. For example, the navigation system includes hard keys and a joystick on a head unit of the navigation system mounted on a dash board, touch screen of the display panel, and voice communication means.

In FIG. 3, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a voice interface and guiding unit 42 for voice communication interface and spoken instructions, a display controller 43 for generating map image (a map guide image and an arrow guide image) on the basis of the map information, a VRAM 44 for storing images generated by the display controller 43, a menu/list generating unit 45 for generating menu image/various list images, a synthesizing unit 46, an address retrieval controller 47, a buffer memory 49, and a monitor (display) 50.

The address retrieval controller 47, the map storage medium (DVD) 31, the monitor 50, and the buffer memory 49 perform a major function of the present invention for assisting a user to quickly and easily search a street name when inputting an address of a destination. The map storage medium 31 or other memory additionally includes specially made precompiled data files for the purpose of implementing the present invention. The address retrieval controller 47 reads the character from the keyboard specified by the user and retrieves a list of city names having street names start with the first character specified by the user.

When the user selects a city name from the list, the address retrieval controller 47 causes to search and list street names within the selected city that start with the specified character. The user scrolls the list of street names to find out the intended street name or inputs a second character of the intended street name. As soon as the second character is specified, the address retrieval controller 47 performs the incremental matching process. The address retrieval controller 47 retrieves the street names that start with the first and second characters with use of character tables in the comprehensive alphabetical usage file and displays a list of street names.

By repeating this procedure, the user is able to find the desired street name easily and quickly without need to enter all of the characters. During this procedure, the information required for processing will be temporarily stored in the buffer memory 49 for achieving a high speed operation. Thus, the address input method and apparatus of the present invention is able to more quickly and easily retrieve the desired address of the destination.

Figure 4:
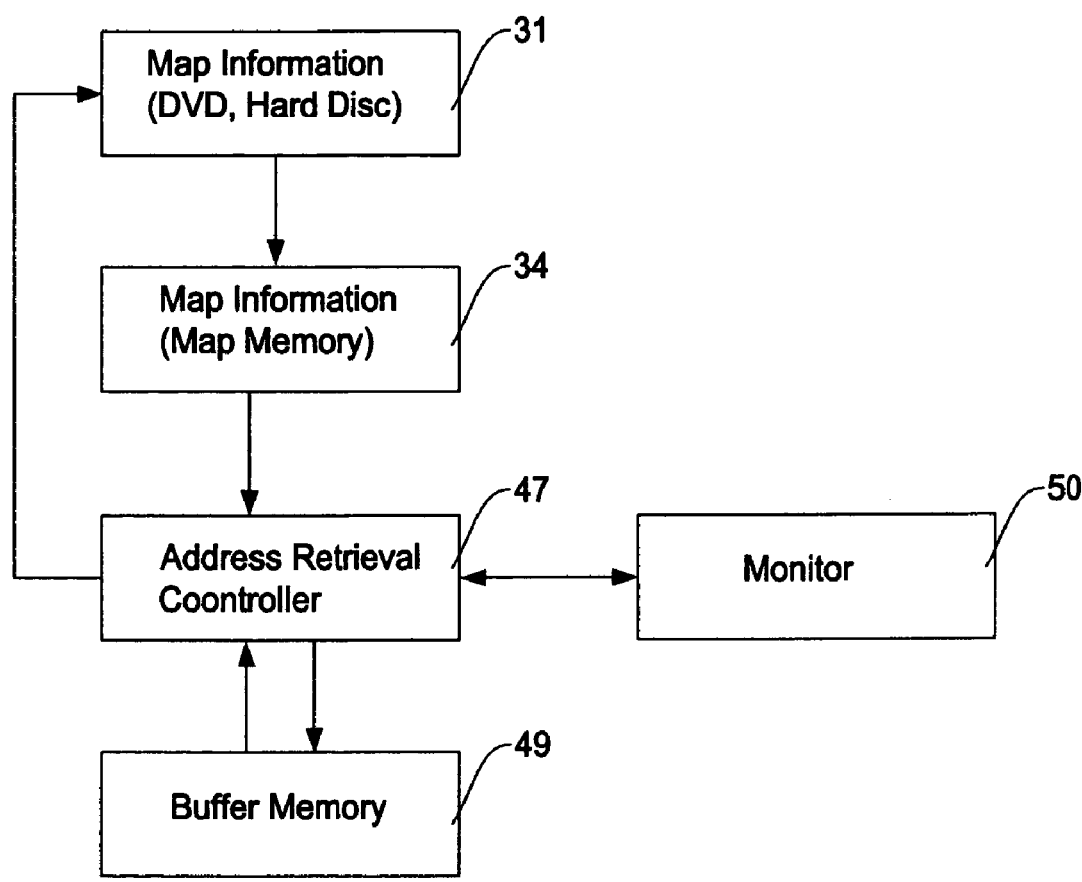
FIG. 4 is a block diagram showing an essential part of the navigation system of the present invention for assisting a user for entering an intended street name when setting a destination.

FIG. 4 shows an example of simplified structure of the address input apparatus for assisting the user to quickly and easily search the street name from the database in accordance with the present invention. In this block diagram, the components in the structure of FIG. 3 which are directly involved in the operation of the present invention are shown for illustrating the essential structure of the present invention. The address input apparatus of FIG. 4 includes the map storage medium 31 such as a DVD or hard disc, the map information memory 34, the address retrieval controller 47, the buffer memory 49, and the monitor 50 with a keyboard. The address retrieval controller 47 can be a part of CPU 39 or a separate microprocessor.

The map storage medium 31 stores the map information encompassing, for example, all over the country. The map memory 34 extracts the map information from the map storage medium 31 repeatedly by an amount necessary for processing the map information such as a predetermined number of street segment data for traveling along the route to a destination. An image based on the map information is displayed on the monitor 50 during a route guidance process. When inputting an address of the destination, the monitor 50 displays a keyboard so that a user can select characters of the street name through the keyboard.

In the present invention, the map storage medium 31 includes specially made data files for retrieval of street name. In other words, data files are precompiled for retrieval of street name data with respect to administrative region data such as per city, county, state, etc. The precompiled files include a city name and first character file which includes a list of city names each having street names that start with one of possible alphabetic characters such as "a", "b", "c" ... "z". Another file which is a comprehensive alphabetical usage file which is configured by a plurality of character tables for each city that list second, third, fourth ... characters of the street names that follow the first character.

When the first character of the street name is specified by the user, the address retrieval controller 47 checks the precompiled files and retrieves city names each having street names that start with the first character. The address retrieval controller 47 controls the monitor 50 to display a list of city names so that the user selects a city name from the list. The address retrieval controller 47 retrieves all of the street names within the selected city that start with the first character and causes the monitor 50 to display a list of the street names. The foregoing procedure can be done with use of the city name and first character file.

The user scrolls the list of the street names that start with the first character and selects one of street names when the user is certain about the street name. Alternatively, in the case where the number of street names is large, the user may prefer to enter the second character to filter out the unwanted street names. The address retrieval controller 47 retrieves the street names within the selected city that start with the first and second characters. The monitor 50 displays a list of the retrieved street names so that the user can select one of them. The user may enter the third character to further narrow down the candidate street names if the list of street names is still large. By repeating this procedure, the intended street name can be found easily and quickly. The foregoing procedure is done by using the comprehensive alphabetical usage tables.

Figure 5A:
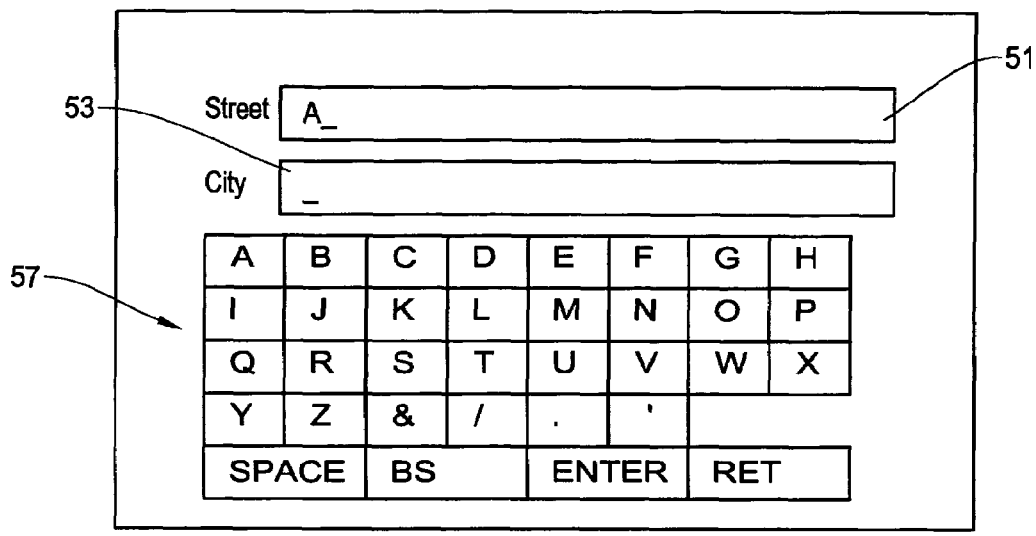
FIGS. 5A-5F are display examples of a navigation system in the present invention for inputting a street name, where a user inputs a first character of an intended street name in FIG. 5A, the navigation system retrieves a city name having street names that start with the specified first character in FIG. 5B, the user scrolls the city name list and selects a particular city name in FIG. 5C, the navigation system displays a list of street names in the selected city that start with the specified first character in FIG. 5D, the user inputs the second character in FIG. 5E for incremental matching, and the navigation system displays a list of street names within in the selected city having the specified first and second characters.

Next, the operation of the street name input method is explained with reference to display examples of FIGS. 5A-5F. FIG. 5A is a display example of a navigation system in the present invention where the user inputs a first character of the intended street name. In this example, the user inputs the first character "A" in a street name box 51 through a keyboard 57 on the monitor 50. Based on the first character, the navigation system searches, through an incremental matching operation, the precompiled files in the map storage medium 31 to retrieve city names having street names that start with the first character "A".

Figure 5B:
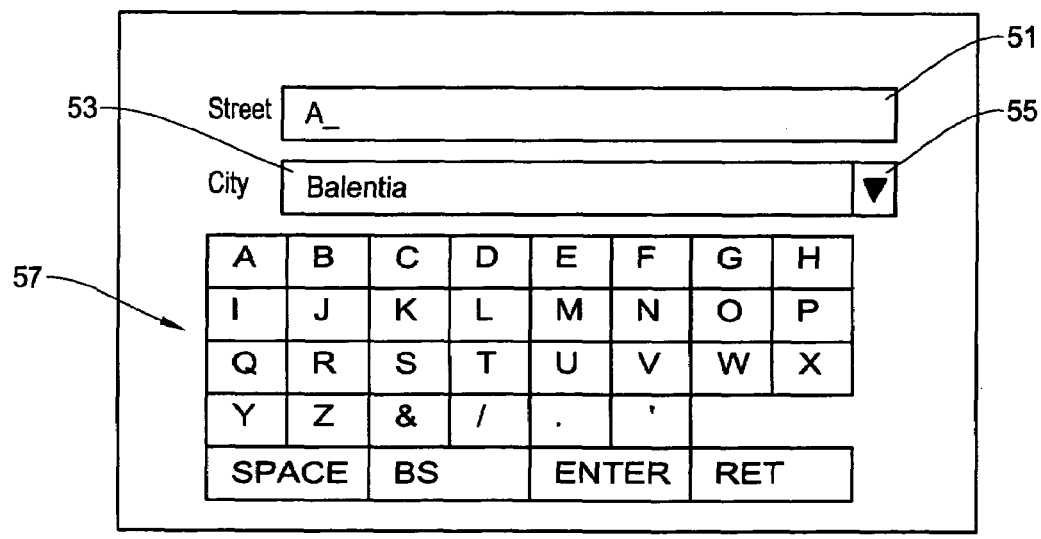
Figure 5C:
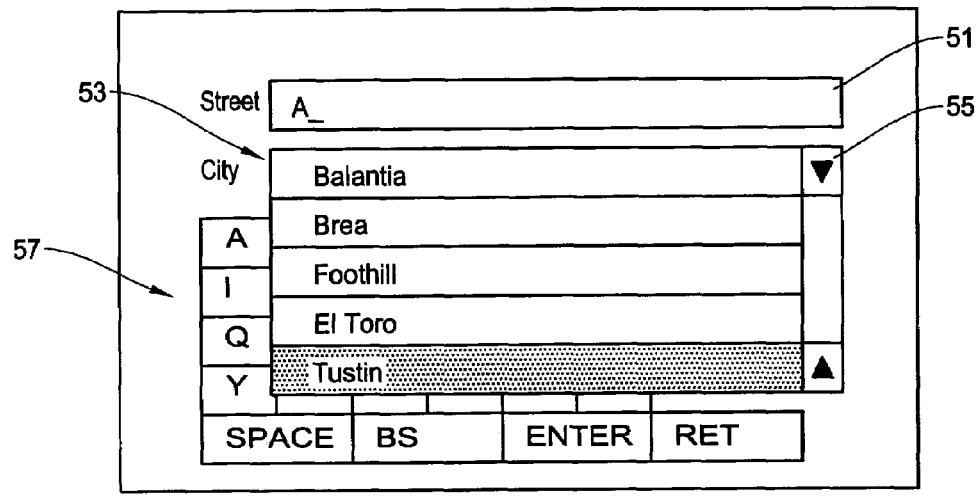
Figure 5D:
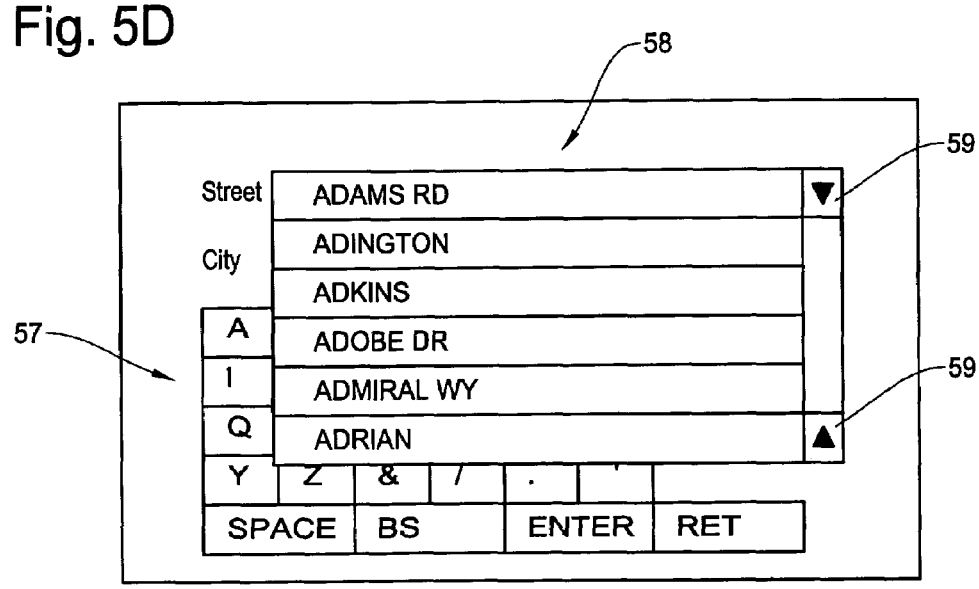

The navigation system displays the resultant city names in a city name box 53 as shown in FIG. 5B. The city name box 53 includes scroll keys 55 which allows the user to scroll the list of city names as shown in FIG. 5C. It is assumed that the user knows that the intended street is in a particular city, such as "Tustin". The user selects one or more cities. Then, the navigation system retrieves the street names that have the first character "A" within the selected city. A list of the retrieved street names is displayed in a street name box 58 as shown in FIG. 5D which includes scroll keys 59.

Figure 5E:
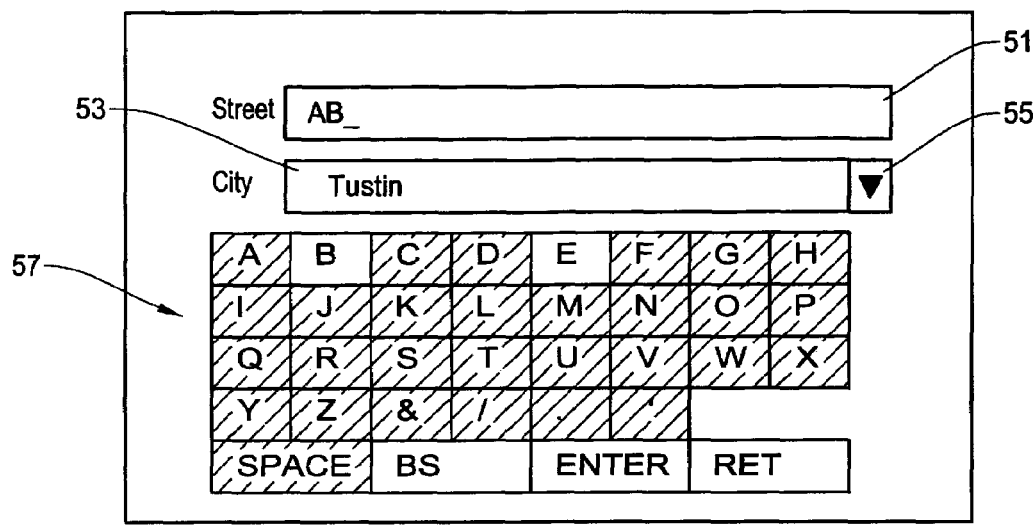
Figure 5F:
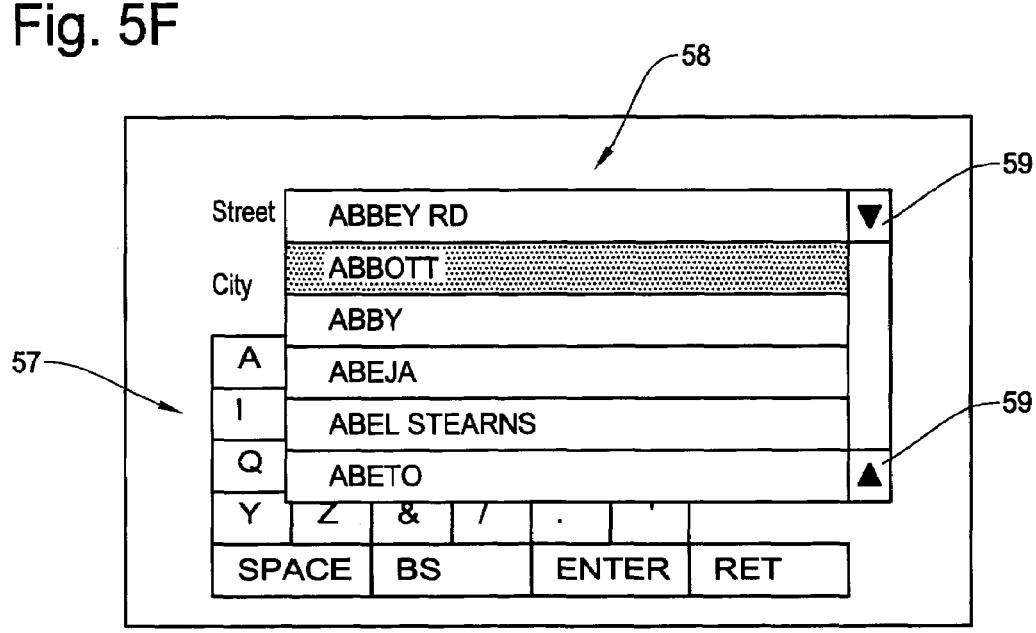

If the street names that start with the first character "A" within the selected city are too numerous, the user is reluctant to look all of the candidate street names in the street name box 58. Instead, if the user is certain about the second character, the user inputs the second character "B" in the box 51 as shown in FIG. 5E. Then, through the incremental matching operation, the navigation system retrieves the street names that have the first and second characters "AB" within the selected city. A list of the retrieved street names is displayed in a street name box 58 as shown in FIG. 5F.

Accordingly, the candidate street names are narrowed down because the two characters are specified with respect to the street names within the particular city. For example, there may be 50 street names that start with "A" within the selected city, there may be 6 street names that start with "AB" within the city, thus, the intended street name can be easily selectable from the list. Thus, by selecting a candidate city and adding the characters of the desired street name, the user can easily and quickly obtain the intended street name.

FIG. 6 is a flow chart showing the steps of inputting a street name for specifying an address of the destination in the present invention. In step 101, the navigation system receives the first character of the intended street name specified by the user. This process corresponds to the display example shown in FIG. 5A where the user inputs the first character "A" through the keyboard 57. In step 102, the navigation system retrieves cities names that have street names which start with the first input character. As noted above, the navigation system has a precompiled data file, i.e., city name and first character file for achieving this purpose in the map storage medium 31 or other storage. The navigation system retrieves the city names with use of the city name and first character file as will be explained with reference to FIG. 7A.

For example, the precompiled city name and first character file may have 1,000 city name entries for street names that start with the letter "A". Likewise, city names that have street names that start with "B" to "Z" are also stored in the precompiled data file. The navigation system displays the list of city names each having the street names starting with the first character as shown in FIG. 5C. Thus, in step 103, the user selects one of the city names as shown in FIG. 5C because the user most likely knows the city name that the intended street exists.

Then, the navigation system searches for the street names that start with the first character within the selected city at step 104 and displays a list of resultant street names. This process corresponds to the display example of FIG. 5D where the navigation system displays the list of street names within the selected city "Tustin" that start with the letter "A". Thus, the user checks the street names by scrolling the list and selects the intended street name from the list. If the search returns too many candidate street names, it may be cumbersome for the user to check all of the street names in the list.

Thus, the user inputs the next (second) character of the intended street name in step 105 which corresponds to the display example of FIG. 5E. Then, in step 106, the navigation system searches for street names that start with the first and second characters within the selected city. In order to efficiently perform this process with a relatively small data size, the navigation system utilizes the precompiled data file called a comprehensive alphabetical usage file. The comprehensive alphabetical usage file is configured by two or more character tables corresponding to second, third, fourth . . . characters of the street names that start with the first character for each city as will be explained with reference to FIG. 7B.

Figure 1A:
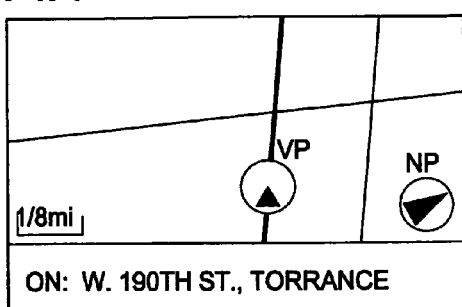
FIGS. 1A-1H are schematic diagrams showing an example of process and screen display of a navigation system for specifying a destination, determining a route to the destination, and guiding a user to the destination.
Figure 1B:
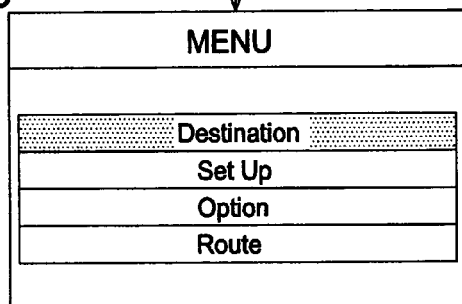
Figure 1C:
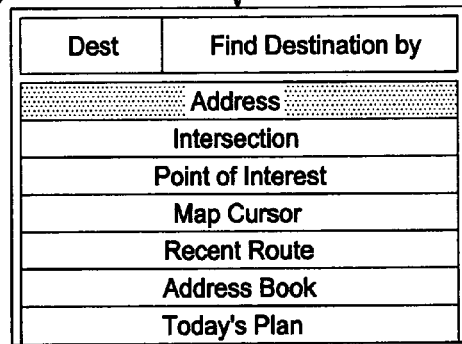
Figure 1D:
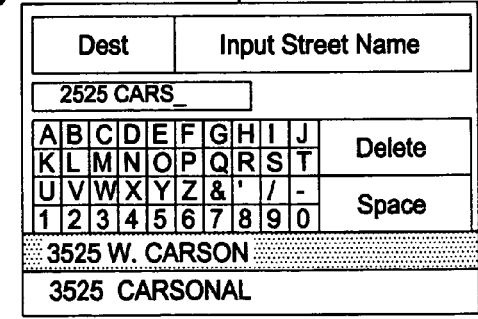
Figure 1E:
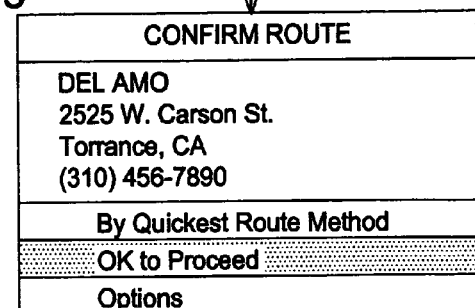
Figure 1F:
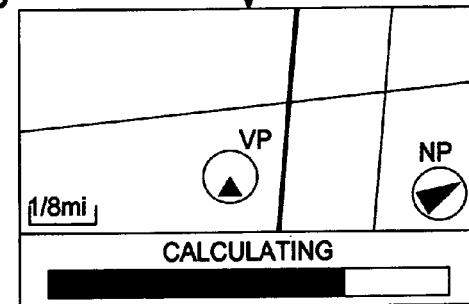
Figure 1G:
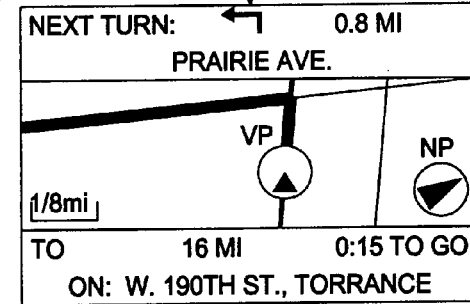
Figure 1H:
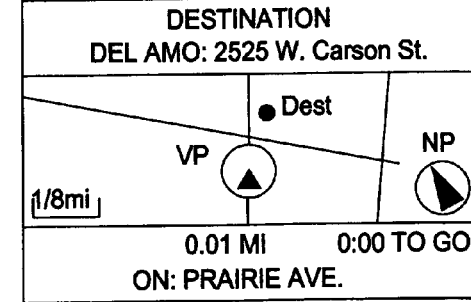
Figure 2A:
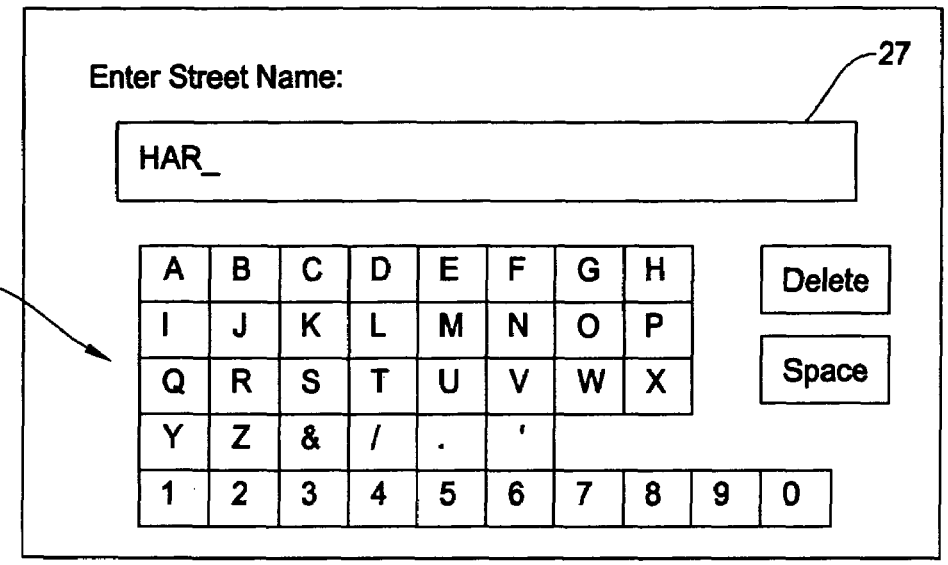
FIG. 2A is a display example showing a keyboard that prompts the user to input street name of a desired destination.
Figure 2B:
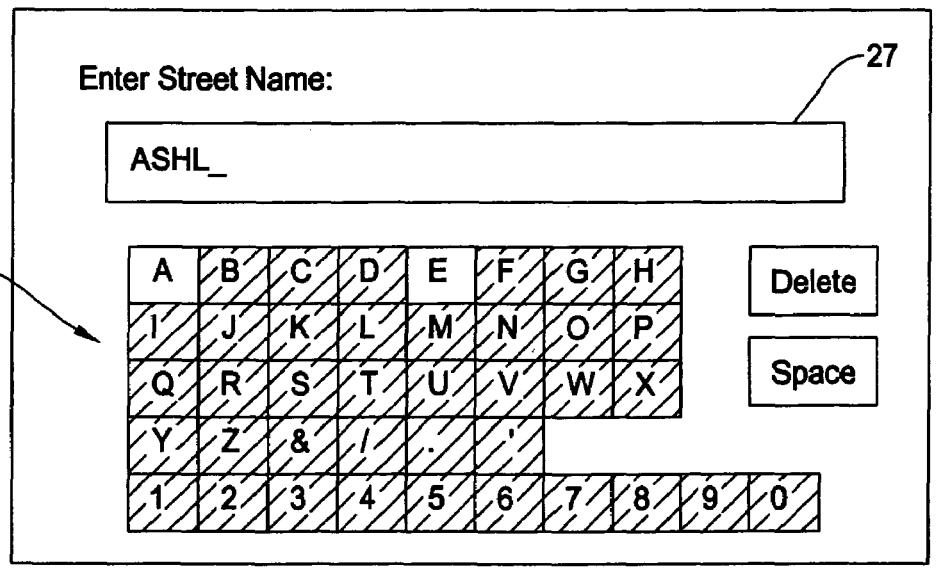
FIG. 2B is a display example showing a keyboard that prompts the user to input street name of a desired destination where an incremental matching method is utilized to assist the user in inputting the desired street name.

At step 107, it is determined whether the intended street name is found through the foregoing process. If the user selects a particular street name, this means that the intended street name is found through the step 106. Then, the user inputs a street number of the selected street name to specify the complete address of the destination. The navigation system confirms the destination and calculates a route to the destination at step 108, which corresponds to the display example of FIGS. 1E and 1F. Then, the navigation system conducts the route guidance operation to the destination as shown in FIGS. 1G and 1H, and the process ends.

FIGS. 7A and 7B are schematic diagrams showing examples of structure of the precompiled data files and the relationship between such files. As noted above, the present invention utilizes the precompiled data files specially made for conducting the address input operation. One of the data files is the city name and first character file shown in FIG. 7A and the other is the comprehensive alphabetical usage file shown in FIG. 7B.

The city name and first character file of FIG. 7A is used for retrieving the city names that have the street names that start with the first character specified by a user as shown in the display example of FIGS. 5B and 5C. In the city name and first character file of FIG. 7A, street names are classified by the first character where each street name is linked to city names that have the street name. Namely, in the example of FIG. 7A, the city name and first character file has a first character column 61, a street name column 63 and a city name column 65.

The first character column 61 lists the first character of all of the street names in the country, i.e., each of all of the alphabetical characters a-z. Although not shown, the first character column 61 may also include each character of numerals 0-9 (FIG. 7B). The street name column 63 lists all of the street names in the country classified by the first character. The city name column 65 lists city names for each street name, thereby indicating that the listed cities have the particular street name.

Thus, for the character "a" of the first character column 61, all of the street names that start with the character "a" such as "Abbey", "Abbot" . . . "Avenida" are listed in the street name column 63. Further, the city names in the city name column 65 are linked to each street name in the city name column 63. For example, since cities A, P, S and Z have the street name "Abbot", such cities are linked to the street name "Abbot" in the file. The street names that start with the other characters "b", "c" . . . "z" are also classified in the same manner described above.

The comprehensive alphabetical usage file of FIG. 7B is used for retrieving the street names within the specified city that start with a combination of the first character and other characters that follow the first character in the process shown in the display example of FIGS. 5E and 5F. The comprehensive alphabetical usage file of FIG. 7B is linked to the city name and first character file of FIG. 7A and is configured by character tables that list second, third, fourth . . . characters of the street names that start with the first character. Namely, in the example of FIG. 7B, the comprehensive alphabetical usage file has a first character column 71, a city name column 73 and a character table column 75.

Although the first character column 71 and the city name column 73 are shown for the illustration purpose, these portions can be a part of the city name and first character file of FIG. 7A which has substantially the same information. Thus, the major part of the comprehensive alphabetical usage file is the character table column 75 which has a plurality of character tables for each city name. The first character column 71 lists the first character of all of the street names in the country, i.e., each of all of the alphabetical characters a-z. In this example, the first character column 71 also includes each character of numerals 0-9. The city name column 73 lists city names that have street names that start with the first character in the first character column 71. Preferably, the information regarding the city names also includes the information regarding the state names associated with the cities. Each row of Tables 1 to X in the character table column 75 is assigned to a corresponding city. In each row of the character table column 75, the Tables 1-X list the data regarding second characters, third characters, . . . X+1 characters, of the street names within the corresponding city that start with the first character in the first character column 71.

For example, in the comprehensive alphabetical usage file of FIG. 7B, a city "Aliso Viejo" is listed at the top which means that the city of "Aliso Viejo" has street names that start with the first character "a". From Tables 1 to X at the top include the data regarding the characters that follow the first character. Namely, Table 1 includes information regarding the second characters of the street names within the city "Aliso Viejo" that start with the first character "a". Table 2 includes information regarding the third characters of the street names within the city "Aliso Viejo" that start with the first character "a". Table X includes information regarding the (X+1)th characters of the street names within the city "Aliso Viejo" that start with the first character "a". It is expected that the four or five character tables for each city is sufficient for a practical application because first five or six characters of the street names can sufficiently narrow down the intended street name.

Thus, when the user inputs a particular first character and selects a particular city, and inputs a second or further characters as shown in FIG. 5E, the navigation system will find candidate street names with use of the character tables of the selected city. For example, if the user inputs the first character "A" as shown in FIG. 5A and selects the city "Tustin" as shown in FIG. 5C, and further inputs the second character "B" as shown in FIG. 5E, the navigation system checks the character Table 1 corresponding to the city "Tustin" in FIG. 7B. Based on the usage data regarding the second character listed in the Table 1, the navigation system retrieves the candidate street names that start with "AB" as shown in FIG. 5F.

FIG. 8A is a schematic diagram showing an example as to how the data in the character tables are structured for retrieving the street names using the combination of the first, second or other characters. This example shows the data associated with the first character "a" of street names within a city A. It is assumed that the city A has six street names that start with the first character "a" as shown in a street name list 81a. The second characters in the street names in the street name list 81a are "b" for "ABALONE", "c" for "ACACIA", "d" for "ADOLF", "e" for "AERO", "i" for "AINTHWORTH" and "AIRPORT". Accordingly, in Table 1 which shows the data regarding the second characters, the characters b, c, d, e, and i are marked by X, thereby indicating the possible second characters of the street names that start with the first character "a" within the city A.

Likewise, the third characters of the street names in the street name list 81a are "a", "o", "r", and "n". Accordingly, in Table 2 which shows the data regarding the third characters, the characters a, o, r, and n are marked by X. Thus, Table 2 indicates the possible third characters of the street names that start with the first character "a" and a second character that follow the first character within the city A. Similarly, the fourth characters c, l, o, p, and t of the street names in the street name list 81*a* are marked in Table 3. In this manner, up to eighth characters are marked in Table 1 to Table X, although not all of the tables are illustrated in FIG. 8A for simplicity.

Thus, when the user inputs "b" as a second character, the navigation system checks the Table 1 which indicates the second characters and retrieves and displays the street name "ABALONE". When the user inputs "i" as a second character, the navigation system checks the Table 1 which indicates the second characters and retrieves and displays the street names "AINTHWORTH" and "AIRPORT". When the user further inputs "r" as a third character after the second character "i", the navigation system checks the Table 2 which indicates the third characters and retrieves and displays the street name "AIRPORT". In a practical application, four or five character tables (fifth or sixth characters) will be sufficient to efficiently narrow down the candidate street names within a particular city. Thus, the character tables will not need to use a large storage area of the map storage medium 31 or other memory.

Similar to FIG. 8A, the schematic diagram of FIG. 8B shows an example as to how the data in the character tables are structured for retrieving the street names using the combination of the first, second and other characters. This example shows the data associated with the first character "b" of street names within the city A. It is assumed that the city A has seven street names that start with the first character "b" as shown in a street name list 81*b*. The second characters in the street names in the street name list 81*b* are "a" for "BAKER", "BARRANCA" and "BAYHILL", "e" for "BEVERLY", "l" for "BLACKBIRD", "r" for "BROADWAY", and "u" for "BUOY". Accordingly, in Table 1 which shows the data regarding the second characters, the above noted characters a, e, l, r, and u are marked, thereby indicating possible second characters of the street names that start with the first character "b" that exist in the city A.

Likewise, the third characters of the street names in the street name list 81*b* are "k", "r", "y", "v" "a" and "o". Accordingly, in Table 2 which shows the data regarding the third characters, the characters k, r, y, v, a, and o are marked by X. Thus, Table 2 indicates the possible third characters of the street names that start with the first character "b" and a second character that follow the first character within the city A. Similarly, the fourth characters e, r, h, c, a and y of the street names in the street name list 81*b* are marked in Table 3. In this manner, up to eighth characters are marked in Table 1 to Table X, although not all of the tables are illustrated in FIG. 8B for simplicity.

Thus, when the user inputs "a" as a second character, the navigation system checks the Table 1 which indicates the second characters and retrieves and displays the street name names "BAKER", "BARRANCA" and "BAYHILL". When the user inputs "r" as a second character, the navigation system checks the Table 1 which indicates the second characters and retrieves and displays the street name "BROADWAY". When the user inputs "r" as a third character after the second character "a", the navigation system checks the Table 2 which indicates the third characters and retrieves and displays the street name "BARRANCA". In this manner, the character tables similar to that shown in FIGS. 8A and 8B are created for all of the remaining first characters c-z and are used for detecting the candidate street names within the selected city based on the second or further characters.

FIG. 9 shows another example of structure of the comprehensive alphabetical usage file of the present invention when the input method of the present invention is applied to the address and area name formats used in Japan. The precompiled file of FIG. 9 corresponds to the precompiled file of FIG. 7B. It should be noted that Japanese phonetic sounds of street names, area names, and city names are described in alphabetical characters. Thus, although the portions indicating the first character in FIGS. 9 and 10 include two alphabetical characters, single character will be used for this parts when this invention is applied to the system using the Japanese language. In such an application using the Japanese language, this file should be called a comprehensive kana letter usage file rather than a comprehensive alphabetical usage file.

Based on the city name and first character file similar to that of FIG. 7A, the comprehensive alphabetical usage file of FIG. 9 includes Japanese city names or area names sorted by first character of address names. In the Japanese address system, an address name indicating a relatively small area and a number indicating a location in the small area are used rather than a street name and street number. In other words, such administrative regions are classified by a Japanese administrative system. An example of address names is shown in an address name list 181 of FIG. 10. In FIG. 9, each city name has a plurality of character tables for detecting address names based on second or other characters that follow the first character.

The comprehensive alphabetical usage file of FIG. 9 includes a first character column 171, a city name column 173, and a character table column 175. The first character column 171 lists the first character of all of the street names in the country, i.e., each of all of the alphabetical characters that correspond to fifty (50) Japanese kana letters. The city name column 173 lists city names that have street names that start with the first character in the first character column 171. The character table column 175 has a plurality of character tables for each city name. Thus, each row of Tables 1-Z in the character table column 175 is assigned to a corresponding city. The Tables 1-Z list the data regarding second characters, third characters, . . . Z+1 characters, of the address names within the corresponding city that start with the first character in the first character column 171.

For example, in the comprehensive alphabetical usage file of FIG. 9, a city "Wako-shi" is listed at the bottom of the city column 173 corresponding to the first character "a". This means that the city of "Wako-shi" has address names that start with the first character "a". From Table 1 to Table Z corresponding to the city of "Wako-shi", each table includes the data regarding the characters that follow the first character. Namely, Table 1 includes information regarding the second characters of the address names within the city "Wako-shi" that start with the first character "a". Table 2 includes information regarding the third characters of the address names within the city "Wako-shi" that start with the first character "a". Table Z includes information regarding the (Z+1)th characters of the address names within the city "Wako-shi" that start with the first character "a". It is expected that four or five character tables for each city is sufficient for a practical application because first five or six characters of the address names can sufficiently narrow down the intended address name.

FIG. 10 is a schematic diagram showing an example as to how the data in the character tables in the column 175 of FIG. 9 are structured for retrieving the address names using the combination of the first, second or other characters. In this example, it is assumed that the user has input the first and second characters "sa", which is a single character in Japanese kana letter, as an address name and selected a particular city name "Hagoromo-shi". Further, it is assumed that the city "Hagoromo-shi" has six address names that start with the characters "sa" as shown in an address name list 181. The third characters in the address names in the address name list 181 are "i" for "saiwai-cho", "r" for "sarashina", "k" for "sakashita-cho", "t" for "satake-cho", "w" for "sawanotsuru" and "y" for "sayonara-cho". Accordingly, in Table 1 which shows the data regarding the third characters, the characters i, k, r, t, w and y are marked by X, thereby indicating the possible third characters of the address names that start with the first and second characters "sa" within the city "Hagoromo-shi".

Likewise, the fourth characters of the address names in the address name list 181 are "a", "o", and "w". Accordingly, in Table 2 which shows the data regarding the fourth characters, the characters a, o and w are marked by X. Thus, Table 2 indicates the possible fourth characters of the address names that start with the characters "sa" and a third character within the city "Hagoromo-shi". In this manner, up to eighth characters are marked in Table 1 to Table Z in the example of FIG. 10, although not all of the tables are illustrated in FIG. 10 for simplicity.

Thus, when the user inputs "r" as a third character, the navigation system checks the Table 1 which indicates the third characters and retrieves and displays the address name "sarashina". When the user inputs "w" as a third character, the navigation system checks the Table 1 which indicates the third characters and retrieves and displays the address names "sawanotsuru". In a practical application, four or five character tables would be sufficient to efficiently narrow down the candidate address names within a particular city.

As has been described above, according to the present invention, the navigation system checks the precompiled data file when a first character is input by the user. The navigation system lists the city names that have the street names which start with the first character specified by the user. Since the user accurately knows at least the first character of the intended street name, the candidate street names will be narrowed down by selecting the city. The user may further input second character and further characters upon which the navigation system incrementally retrieves candidate street names with use of the comprehensive alphabetical usage file. By repeating this procedure, the user is able to find the desired street name easily and quickly without need of entering all of the characters. The user is able to find the desired street name easily and quickly even when he is not certain about the spelling of the street name.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. An apparatus for inputting an address of a destination in a navigation system, comprising:

means for receiving a only first character of a street name of a destination specified by a user before receiving any other information on the destination;

means for reading a precompiled data file based solely on the first character specified by the user to search administrative regions that have street names that start with the first character specified by the user;

means for immediately displaying a list of names of the administrative regions that have the street names that start with the first character specified by the user where the administrative regions in the list have been searched from all over a country;

means for receiving a name of the administrative region selected by the user from the list of the names of the administrative regions;

means for displaying candidate street names that start with the first character specified by the user within the selected administrative region; and means for accepting a street name of the destination selected by the user from the candidate street names;

whereby sequentially searching for the destination in the order of (1) the first character of street names, (2) the name of the administrative region, and (3) the street name within the selected administrative region.

2. An apparatus for inputting an address as defined in claim 1, further comprising:

means for receiving a second character of the street name of the destination specified by the user;

means for retrieving candidate street names that start with the first and second characters within the selected administrative region;

means for displaying candidate street names that start with the first and second characters specified by the user within the selected administrative region; and means for repeating the above steps for further characters that follow the first and second characters.

3. An apparatus for inputting an address as defined in claim 1, wherein said street name that indicates the address of the destination is specified by alphabetical characters or a combination of alphabetical characters and numeral characters.

4. An apparatus for inputting an address as defined in claim 3, wherein said administrative region includes city, county, and state.

5. An apparatus for inputting an address as defined in claim 1, wherein said precompiled data file includes a data file which classifies administrative region names according to the first character of said street name.

6. An apparatus for inputting an address as defined in claim 1, wherein said precompiled data file includes a comprehensive alphabet usage file which has a plurality of character tables that indicate possible characters of the street names that follow the first character within the selected administrative region.

7. An apparatus for inputting an address as defined in claim 4, wherein city names and state names are associated with one another in the precompiled data file and are sorted by the first character of the street names throughout the country.

8. An apparatus for inputting an address as defined in claim 1, wherein said address of the destination is expressed by Japanese language and the first character and other characters are Japanese kana letters.

9. An apparatus for inputting an address of a destination as defined in claim 8, wherein said data in said precompiled data file is expressed by Japanese language and said administrative regions are classified by a Japanese administrative system.

* * * * *